Reissued Feb. 25, 1941

Re. 21,729

UNITED STATES PATENT OFFICE 21,729

METHOD OF TREATING FIBROUS MATERIAL

Walther Schrauth, deceased, late of Berlin-Dahlem, Germany, by Gunther von Berg, executor, Berlin, Germany; said Schrauth assignor, by mesne assignments, to American Hyalsol Corporation, Wilmington, Del., a corporation of Delaware No Drawing. Original No. 2,141,845, dated December 27, 1938, Serial No. 82,917, June 1, 1936. Application for reissue November 29, 1939, Serial No. 306,715. In Germany July 27, 1928

15 Claims. (Cl. 19—66)

The present invention relates to the treatment of fibrous material, either natural or artificial, to improve its condition for working operations, such as spinning, winding, softening, gluing, sizing, weaving and brightening or to increase the resistance to damage or to render the fibre smooth and supple and to impart thereto a better handle.

Agents commonly used for conditioning or greasing fibrous material include principally fats, oils, waxes, paraffin and other high molecular hydrocarbons and also mineral oils and higher fatty acids, such as stearic acid, palmitic acid and oleic acid. There are, however, cases in which it will not suffice for the fibres readily to absorb the agents used, but it is desirable that after the operations on the fibrous material the agents should be readily removable from the fibre either partially or entirely as utility may require. In addition to these properties, it is desirable that the agents used should meet several other requirements. They should not injure the fabric or otherwise affect it objectionably, as, for example, by making it tacky or otherwise giving it an unpleasant feel. It is further important that the agents used, especially if they are to be left in the fibre either permanently or for a considerable time, should be non-odorous and as far as possible neutral and not subject to decomposition under the action of light and air. They must be as stable as possible and have no corroding effect on machinery and appliances with which the material comes in contact during the processes of manufacture.

Greasing agents heretofore used have been only partly satisfactory. Waxes and hydrocarbons are difficult to remove from the fibre. The fatty acids are not always neutral to the fibre and above all they have a highly corrosive effect on working appliances. The heavy metal salts of the fatty acids penetrate the fibre and can be removed only with great difficulty. Fats and oils are decomposed by the action of light and air and turn rancid and the resultant fatty acids act upon the metal parts of working appliances.

The higher molecular fatty alcohols including the so-called wax alcohols having from 8 to 30 carbon atoms such as the octyl, decyl, lauryl, myristyl, cetyl, stearyl, hexadecenyl, oleyl, ricinoleyl, linoleyl, dihydroxy octadecane, eicosyl, carnaubyl, ceryl, cerotyl and myricyl offer most of the advantages of the greasing materials heretofore used and are free from most of the disadvantages. These alcohols are particularly effective when used for the treatment of threads, fibres and fabrics of wool, cotton, natural and artificial silk in preparing the same for various operations, such as spinning, winding, softening, sizing, brightening, dyeing, etc. It has been proposed heretofore to apply some of these alcohols by first dissolving them in organic solvents such as carbon-tetra-chloride, pyridine, benzene, and the like.

It has now been discovered, in accordance with the present invention, that several advantages in the use of the aforesaid alcohols are obtained if sulfonates of the same or related alcohols are combined therewith. The presence of the sulfonates makes it possible to form emulsions of the alcohols in water. The necessity for using the solvents heretofore used is thus eliminated in a particularly satisfactory manner in that the sulfonates themselves have a desirable effect upon the fibre.

The sulfonates possess an excellent wetting out and dispersing power. Owing to this they promote in mixture with the alcohols the penetrating effect of the alcohols in the fibre. In this manner they impart to the fibre a most stable smoothness. On the other hand regarding the emulsifying properties of the sulfonates the mixtures of the alcohols and the sulfonates can be removed, if necessary, more easily by means of water.

The aforesaid alcohols are perfectly neutral and non-odorous and they have no detrimental effect whatever on the fibre and on the working appliances. Moreover they are absolutely stable to the action of light and air.

When used for greasing, the alcohols mentioned have also the property of imparting to the fibre great suppleness, insensitiveness to water and resistance to deleterious chemical action, since they are highly resistant to the action of chemical agents.

Any of the fatty alcohols, that is to say the primary aliphatic saturated and unsaturated alcohols having 8 to 30 carbon atoms in the molecule may be used but the most satisfactory are those having 12 to 18 carbon atoms in the molecule.

It has been discovered further in accordance with the present invention that naphthenic alcohols can be advantageously used instead of or combined with the fatty alcohols. The naphthenic alcohols may be used either alone or as emulsions in combination with the sulfonates of the fatty alcohols or of the sulfonates of naphthenic alcohols. They have a somewhat different effect than the fatty alcohols in use. For example, they are according to their smaller water repelling properties more easily removable from the fibre. This effect is very important in such cases, in which the fibres are impregnated only during a working operation of the manufacture. By impregnating with the naphthenic alcohols one even obtains on the fibre a certain moisture content, which prevents the drying up of the fibre, that no moistening of the factory rooms is necessary. Furthermore the naphthenic alcohols have on account of their certain amount of sulfur compounds a valuable disinfecting power, which protects the fibre against mould and other damages.

A composition consisting of alcohols selected from the above mentioned groups, especially those saturated primary alphatic alcohols having from 12 to 18 carbon atoms or the unsaturated primary aliphatic alcohols having 16 to 22 carbon atoms, combined with sulfonates of the alcohols of the same group provides a particularly effective and valuable treating composition. The proportion of sulfonate may vary over a wide range in accordance with the results desired. Ordinarily from 0.5 to 75% by weight of sulfonate in the mixture gives a good mixture for usual commercial purposes. About 5% by weight is probably most satisfactory for greasing fibres. If it is desired that the treating material shall remain in the fibrous material only during the working operations and shall be substantially entirely washed out thereafter, a larger proportion of sulfonate, as for example, about 10% is desirable. If on the other hand it is desired that a substantial proportion of the alcohol shall be retained in the fibrous material after the manufacturing operations are completed in order to condition the material as, for example, to render it water resistant or to give a soft handle, then a composition having less sulfonate, for example about 0.5%, will be found more satisfactory.

Mixtures of paraffin oil and oleyl alcohol, wherein the paraffin oil is from 20 to 80% of the mixture to which may be added from 0.5 to 50% of a sulfonate, as for example lauryl sulfate are particularly suitable for greasing purposes. For use an emulsion of the mixture is prepared. These compositions may also be combined with other treating agents toward which they are neutral. Good results are obtained, for example, by using them conjointly with emulsions of fatty substances, oil, waxes, hydrocarbons, mineral oils and the like.

As is well known the paraffin used in treating fibrous material has hydrophilic and slip producing properties and is insoluble in water. The high molecular alcohols may be described as hydrophilic polar substances insoluble in water and carrying an alkyl radical having at least 8 carbon atoms and a hydrophilic group. The sulfonates of the high molecular alcohols include the true sulfonates and the salts of the sulfuric acid esters thereof.

Compositions containing alcohol and a sulfonate are particularly effective for use in acid baths such as dyeing, and in mercerizing and the like baths, because they are not decomposed by the acids and alkalies usually used.

The compositions are effective for brightening and sizing of artificial fibres, threads, or fabrics and for the greasing of wool to be worked up into worsted yarn. They are advantageously employed in the manufacture of artificial threads. For example in making viscose silk even a comparatively small amount of the alcohols mentioned, or better still, a mixture of the alcohols and their sulfonates added in the form of emulsions to the highly concentrated sulfuric acid precipitating bath will be sufficient to prevent the sticking of the threads and protect them from the injurious action of the sulfuric acid.

The alcohols and the sulfonates combined therewith may be used alone or with other usual treating agents.

The term "sulfonate" is used herein in its broader sense to include not only the true sulfonates, but the sulfuric acid esters or sulfates.

*Example 1*

For the sizing of artificial silk one may use an aqueous emulsion containing 5% of wool fat alcohol which contains 8% of the sodium sulfate of oleyl alcohol. The material treated with this emulsion can easily be de-sized by means of water owing to the good emulsive property of the fatty alcohols in connection with the sulfonate used.

*Example 2*

An avivage bath for artificial silk which will impart a soft and lithe handle to the silk can be prepared by adding to 800 parts of water 20 parts of a concentrated emulsion of 0.75 part of myristyl alcohol, 2.5 parts of cetyl alcohol and 0.17 part of sodium lauryl sulfonate in 20 parts of water.

*Example 3*

To soften wool prior to the spinning operation one may employ an aqueous emulsion containing besides 15% of mineral oil and 3% of oleyl alcohol 3–5% of the sodium sulfate of oleyl alcohol. Owing to the presence of the fatty alcohol sulfonate in combination with the fatty alcohols in the softening emulsion the mineral oil used for greasing is easily removed from the fibre by water.

*Example 4*

A good loading and finishing composition is obtained by working up 150 parts of dextrine, 80 parts of potato starch, 3 parts of cetyl alcohol, 1 part of oleyl alcohol, 5 parts of a 30% aqueous paste of the sodium salt of oleyl alcohol sulfuric acid ester to an aqueous emulsion together with the desired amount of a loading material such as kaolin, china clay or the like.

*Example 5*

A finishing composition may also be prepared by emulsifying 150 parts of dextrine, 2 parts of stearyl alcohol and 5 parts of a 30% aqueous oleyl alcohol sulfonate paste per litre of water and adding the desired amount of loading substances such as kaolin, china clay or the like.

*Example 6*

2% naphthenic alcohol and 0.3 to 0.5% of the sodium salt of the true sulfonic acid of myristin alcohol are added to the carbonizing acid usually employed, i. e., sulfuric acid of about 4° Bé. By this admixture one obtains a ready and perfectly uniform wetting of the fibres.

*Example 7*

An impregnating bath for cotton fabrics which will impart a soft handle to the fabrics is obtained by adding 3 parts of naphthenic alcohol and 0.17 part of the sodium salt of the sulfuric acid ester of the naphthenic alcohol to 100 parts of water.

*Example 8*

An excellent avivage effect on wool may be obtained by impregnating the wool with a solution of 3.5 parts of naphthenic alcohol in 100 parts of trichlorethylene. After impregnating the wool is squeezed off and the excess of the solvent is removed.

*Example 9*

Prior to the spinning operation the wool may be softened with an aqueous emulsion containing 18% of mineral oil, 5% of naphthenic alcohol and 5% of the sodium salt of the sulphuric acid ester of the oleyl alcohol. This impregnation can easily be removed after operation.

The foregoing particular description is illustrative merely and is not intended as defining the limits of the invention.

This application is a continuation in part of the applicant's copending application, Serial No. 671,010, filed May 13, 1933.

What is claimed is:

1. The method of treating natural or finished artificial textile fibres or fabrics to enhance their fitness for working and to improve their quality which comprises applying thereto an emulsion of alcohol of the group consisting of the primary aliphatic alcohols containing 8 to 30 carbon atoms in the molecule and the naphthenic alcohols with a sulfonate of an alcohol of such group.

2. The method of treating natural or finished artificial textile fibres or fabrics to enhance their fitness for working and to improve their quality which comprises applying thereto an emulsion of high molecular, primary aliphatic alcohol containing 8 to 30 carbon atoms in the molecule with a sulfonate of such an alcohol.

3. The method of treating natural or finished artificial textile fibres or fabrics to enhance their fitness for working and to improve their quality which comprises applying thereto an emulsion of high molecular primary aliphatic alcohol containing 12 to 18 carbon atoms in the molecule with a sulfonate of such an alcohol.

4. The method of treating natural or finished artificial textile fibres or fabrics to enhance their fitness for working and to improve their quality which comprises applying thereto an emulsion of naphthenic alcohol with a sulfonate of naphthenic alcohol.

5. The method of treating natural or finished artificial textile fibres or fabrics to enhance their fitness for working and to improve their quality which comprises applying thereto an emulsion of naphthenic alcohol with a sulfonate of an alcohol of the group consisting of the primary aliphatic alcohols containing 8 to 30 carbon atoms in the molecule.

6. The method of treating natural or artificial textile fibres or fabrics according to claim 1 wherein the sulfonate is equal to 0.5 to 75% of the weight of the alcohol.

7. The method of treating natural fibrous material to enhance its fitness for working and to improve the quality thereof which comprises applying thereto naphthenic alcohols and the reaction products of these alcohols with sulfuric acid.

8. The method of treating natural fibrous material to enhance its fitness for working and to improve the quality thereof which comprises applying thereto an emulsion of naphthenic alcohol and a sulfonate of an aliphatic alcohol having 12 to 18 carbon atoms in the molecule.

9. The method of treating natural or finished artificial textile fibres or fabrics to enhance their fitness for working and to improve their quality which comprises applying thereto an emulsion of primary aliphatic alcohol containing 18 carbon atoms in the molecule with a sulfonate of primary aliphatic alcohol containing 18 carbon atoms in the molecule.

10. The method of treating natural or artificial textile fibres or fabric according to claim 1, wherein the weight of the sulfonate amounts to about 5 to 10% of the weight of the alcohol.

11. The method of treating natural or artificial textile fibres or fabric according to claim 3, wherein the weight of the sulfonate amounts to about 5 to 10% of the weight of the alcohol.

12. The method of treating natural or finished artificial textile fibres or fabrics to enhance their fitness for working and to improve their quality which comprises applying thereto an emulsion of primary aliphatic alcohol containing 18 carbon atoms in the molecule with a sulfonate of primary aliphatic alcohol containing 18 carbon atoms in the molecule together with paraffin having hydrophobic and slip producing properties and further being insoluble in water.

13. The method of treating natural or finished artificial textile fibres or fabrics to enhance their fitness for working and to improve their quality which comprises applying thereto an emulsion of alcohol of the group consisting of the primary aliphatic alcohols containing 8 to 30 carbon atoms in the molecule and the naphthenic alcohols with a sulfonate of an alcohol of such group together with paraffin having hydrophobic and slip producing properties and further being insoluble in water.

14. The method of treating natural or finished artificial textile fibres or fabrics to enhance their fitness for working and to improve their quality which comprises applying thereto an emulsion of high molecular primary aliphatic alcohol containing 12 to 18 carbon atoms in the molecule with a sulfonate of such an alcohol together with paraffin having hydrophobic and slip producing properties and further being insoluble in water.

15. A new product for increasing the facility of slip of textile material consisting of an emulsion of paraffin, said paraffin having hydrophobic and slip producing properties and further being insoluble in water; a hydrophilic polar substance insoluble in water carrying an alkyl radical having at least 10 carbon atoms and a hydrophilic group; and a hydrophilic water soluble polar compound having emulsifying properties and comprising the salt of a sulphuric acid ester of an aliphatic alcohol having at least 10 carbon atoms.

GUNTHER VON BERG,
*Executor of the Estate of Walther Schrauth, Deceased.*